US011549562B2

(12) United States Patent
Hufnagel et al.

(10) Patent No.: US 11,549,562 B2
(45) Date of Patent: *Jan. 10, 2023

(54) ELECTROMAGNETICALLY ACTUABLE BRAKE DEVICE

(71) Applicant: SEW-EURODRIVE GMBH & CO. KG, Bruchsal (DE)

(72) Inventors: Timo Hufnagel, Eppingen (DE); Gerolf Fichtner-Pflaum, Kraichtal-Unteröwisheim (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 86 days.

This patent is subject to a terminal disclaimer.

(21) Appl. No.: 17/146,726

(22) Filed: Jan. 12, 2021

(65) Prior Publication Data
US 2021/0131512 A1    May 6, 2021

Related U.S. Application Data

(63) Continuation of application No. 15/536,103, filed as application No. PCT/EP2015/002278 on Nov. 13, 2015, now Pat. No. 10,914,354.

(30) Foreign Application Priority Data

Dec. 16, 2014    (DE) .......................... 102014018485.4

(51) Int. Cl.
*F16D 66/02* (2006.01)
*B60T 13/74* (2006.01)
(Continued)

(52) U.S. Cl.
CPC .......... *F16D 66/024* (2013.01); *B60T 13/748* (2013.01); *B60T 17/22* (2013.01);
(Continued)

(58) Field of Classification Search
CPC ...... F16D 66/024; F16D 66/022; F16D 65/18; F16D 59/02; F16D 2055/0058;
(Continued)

(56) References Cited

U.S. PATENT DOCUMENTS 3,553,643 A    1/1971    Maras
3,882,448 A    5/1975    Shibatani
(Continued)

FOREIGN PATENT DOCUMENTS

DE    19749608 C1    3/1999
DE    19814042 C1    7/1999
(Continued)

OTHER PUBLICATIONS

International Search Report dated Apr. 6, 2016, in International Application No. PCT/EP2015/002278. (English-language translation).

(Continued)

*Primary Examiner* — Xuan Lan Nguyen
(74) *Attorney, Agent, or Firm* — Carter, DeLuca & Farrell LLP

(57) ABSTRACT

An electromagnetically actuable brake device includes: a coil shell, in particular of the solenoid, an armature disk, which is connected to the coil shell in a torque-proof yet displaceable manner, a sensor having a sensor housing, a spring part, and a screwed cable gland. The coil shell has a stepped through bore, the sensor housing of the sensor has a stepped configuration, the screwed cable gland is situated at an end of the bore, in particular is screwed into a threaded section of the bore, the spring part is situated in the bore between the screwed cable gland and the sensor housing, the spring part is braced on a step of the sensor housing on one
(Continued)

side and on the screwed cable gland on the other, and the sensor housing is pressed against a step of the bore, in particular by the spring part.

20 Claims, 4 Drawing Sheets

(51) Int. Cl.
| | |
|---|---|
| *F16D 55/228* | (2006.01) |
| *F16D 55/28* | (2006.01) |
| *F16D 65/18* | (2006.01) |
| *H02K 5/22* | (2006.01) |
| *H02K 7/102* | (2006.01) |
| *H02K 7/104* | (2006.01) |
| *H02K 11/27* | (2016.01) |
| *H02K 49/00* | (2006.01) |
| *H02K 11/20* | (2016.01) |
| *B60T 17/22* | (2006.01) |
| *H02K 49/04* | (2006.01) |
| *F16D 121/24* | (2012.01) |
| *F16D 121/22* | (2012.01) |

(52) U.S. Cl.
CPC .......... *B60T 17/221* (2013.01); *F16D 55/228* (2013.01); *F16D 55/28* (2013.01); *F16D 65/18* (2013.01); *F16D 66/021* (2013.01); *F16D 66/022* (2013.01); *H02K 5/225* (2013.01); *H02K 7/104* (2013.01); *H02K 7/1021* (2013.01); *H02K 11/20* (2016.01); *H02K 11/27* (2016.01); *H02K 49/00* (2013.01); *H02K 49/04* (2013.01); *F16D 2121/22* (2013.01); *F16D 2121/24* (2013.01)

(58) Field of Classification Search
CPC ............. F16D 2121/24; F16D 2121/22; F16D 55/228; F16D 55/28; B60T 13/748; B60T 17/22; B60T 17/221; H02K 11/27; H02K 7/1021; H02K 7/104; H02K 5/225; H02K 49/04
See application file for complete search history.

(56) References Cited

U.S. PATENT DOCUMENTS

| | | | |
|---|---|---|---|
| 6,047,793 A | 4/2000 | Hasegawa | |
| 6,090,006 A | 7/2000 | Kingston | |
| 6,176,352 B1 | 1/2001 | Maron | |
| 6,725,977 B2 * | 4/2004 | Takanashi | F16D 66/022 188/1.11 L |
| 7,849,976 B2 | 12/2010 | Kawahara | |

FOREIGN PATENT DOCUMENTS

| | | |
|---|---|---|
| DE | 19922251 A1 | 11/2000 |
| DE | 202005009053 U1 | 8/2005 |
| DE | 10314390 B4 | 11/2012 |
| DE | 102012016089 A1 | 2/2014 |
| DE | 102013006605 A1 | 10/2014 |
| EP | 1001508 A1 | 5/2000 |
| WO | 2007/121815 A1 | 11/2007 |

OTHER PUBLICATIONS

International Preliminary Report on Patentability, dated Jun. 20, 2017, in International Application No. PCT/EP2015/002278. (English-language translation).

\* cited by examiner

ELECTROMAGNETICALLY ACTUABLE BRAKE DEVICE

CROSS-REFERENCE TO RELATED APPLICATIONS

The present application is a continuation of U.S. patent application Ser. No. 15/536,103, which is the national stage of PCT/EP2015/002278, having an international filing date of Nov. 13, 2015, and claims priority to Application No. 10 2014 018 485.4, filed in the Federal Republic of Germany on Dec. 16, 2014, each of which is expressly incorporated herein in its entirety by reference thereto.

FIELD OF THE INVENTION

The present invention relates to an electromagnetically actuable brake device.

BACKGROUND INFORMATION

It is generally known that brake devices are subject to wear.

SUMMARY

Therefore, example embodiments of the present invention provide for increasing the safety in brake devices in the most compact manner possible.

Among features of an electromagnetically actuable brake device according to an example embodiment of the present invention are that the device includes:
 a coil shell, in particular of the solenoid,
 an armature disk, which is joined to the coil shell in a torque-proof yet displaceable manner,
 a sensor including a sensor housing,
 a spring part, and
 a screwed cable gland.

The coil shell has a stepped through bore.
The sensor housing of the sensor has a stepped design.
The screwed cable gland is situated at an end of the bore and, in particular, is screwed into a threaded section of the bore.
The spring part is situated in the bore between the screwed cable gland and the sensor housing.
The spring part is braced on a step of the sensor housing on one side and braced on the screwed cable gland on the other.
The sensor housing is pressed against a step of the bore, in particular by the spring part.

This has the advantage that the sensor is able to be used for monitoring the function and wear and that the solution is compact because the sensor together with the press-on device is integrated into the brake. The sensor may be arranged as an eddy-current sensor. The spring part presses the sensor against a step of the bore, the spring being braced on a screwed cable gland through which the sensor cable is routed to the outside, this passage being arranged as a sealed passage. In addition, the screwed cable gland tightly seals the bore. The sensor makes it possible to sense the distance from the sensor to the armature disk, in particular in the non-energized state of the coil, the coil, inserted into the coil shell, attracting the armature disk to the coil shell when energized. This is so because in the absence of a current supply, spring elements push the armature disk away from the coil shell, and thus away from the sensor, up to the stop on a brake-pad carrier carrying brake pads, whereupon the brake-pad carrier is pressed onto a part having a counter-brake surface.

Thus, there is no need to enlarge the brake in order to use the sensor, and the sensor is able to be placed inside the protected brake housing.

Among features of an electromagnetically actuable brake device according to an example embodiment of the present invention are that the device includes:
 a first and a second coil shell,
 a first armature disk, which is connected to the first coil shell in a torque-proof yet displaceable manner,
 a second armature disk, which is connected to the second coil shell in a torque-proof yet displaceable manner,
 a sensor having a sensor housing, a spring part, and
 a screwed cable gland.

The first and the second coil shell each have a through bore, the two bores being aligned coaxially with respect to each other, or in other words, the two bores therefore having in particular the same radial distance from a shaft to be braked and covering the same peripheral angular range.

The bore in the second coil shell has a stepped configuration.

The sensor housing of the sensor has a stepped configuration.

The screwed cable gland is situated at the end, facing away from the second coil shell, of the bore in the first coil shell, and in particular is screwed into a threaded section of the bore.

The spring part is situated in the first or the second bore, between the screwed cable gland and the sensor housing.

The spring part is braced on a step of the sensor housing on one side and on a sleeve, which touches the screwed cable gland at its end facing away from the spring part, on the other.

The spring part is braced on the screwed cable gland on one side and on a sleeve, which touches a step of the sensor housing on the other.

The sensor housing is pressed against a step of the bore, in particular by the spring part.

This has the advantage that in the case of a dual brake, the sensor is able to be placed in a second brake, and the screwed cable gland is able to be placed in a first brake. A sleeve situated between the spring part and its bracing point extends the manageable distance between the screwed cable gland and the sensor. It is therefore possible to route the bore through the first coil shell, the second coil shell, and the armature disk of the first brake.

The axial range covered by the sleeve may overlap with the axial range covered by the first and the second coil shell. This is considered advantageous insofar as a great distance is able to be obtained.

The sleeve may project through a through bore of the first armature disk. This is considered advantageous insofar as it allows for a compact design of the brake.

The sleeve may be situated at a greater radial distance from the axis of the shaft to be braked than a brake-pad carrier which is connected in a torque-proof yet axially displaceable manner to the shaft to be braked. This has the advantage that the sleeve is situated within the brake and, in particular, is also at least partially situated in one or a plurality of bore(s) but still does not hamper the rotational motion of the brake-pad carrier.

A cover may be connected to the first and the second coil shell so that the intermediate region between the first and the second coil shell is enclosed in the manner of a housing, in particular, the first armature disk being situated in the intermediate region. This is considered advantageous insofar as the interior space of the brake, and thus also the sensor situated in the interior, is surrounded in the manner of a housing.

A second cover may be connected to the second coil shell and to the part having a counter-brake surface, so that the intermediate region between the part and the second coil shell is surrounded in the manner of a housing, in particular the second armature disk being situated in the intermediate region. This has the advantage that the interior space of the second brake together with the sensor situated there is also surrounded in the manner of a housing.

The first and/or the second cover may be made from a more elastic material than the coil shells, especially from plastic or rubber. This has the advantage that a nonpositive connection of a highly protective type is able to be created.

The sensor and the bore may be disposed at a greater radial distance from the axis of the shaft to be braked than a coil of the solenoid, that is to say, in particular the electromagnetically actuable brake device. This has the advantage that the sensor is integrated into the brake but no modification is required at the coil.

The armature disk may be able to cover the bore, especially when the armature disk is resting against the coil shell. This has the advantage that when energy is supplied to the coil, the armature is attracted to the coil shell and thus, also to the sensor. As a result, the armature disk covers the bore since it is larger than the bore cross-section.

The peripheral angular range covered by the armature disk may cover the peripheral angular range covered by the bore, and the radial distance range covered by the armature disk may cover the radial distance range covered by the bore, in particular no part being situated in the intermediate region between the armature disk and the sensor. This has the advantage that the armature disk covers the bore when the coil is energized and the armature disk is therefore pulled in the direction of the coil shell.

A cable may be centrically routed from the sensor through the spring part and centrically through the screwed cable gland. This is considered advantageous insofar as it allows for a simple cable layout.

The sensor may be arranged as an eddy-current sensor, in particular for sensing the distance between the armature disk and the eddy-current sensor. This has the advantage that a very high resolution is able to be achieved when sensing the position of the armature disk.

Further features and aspects of example embodiments of the present invention are discussed in greater detail below with reference to the appended Figures.

DETAILED DESCRIPTION

Figure 1:
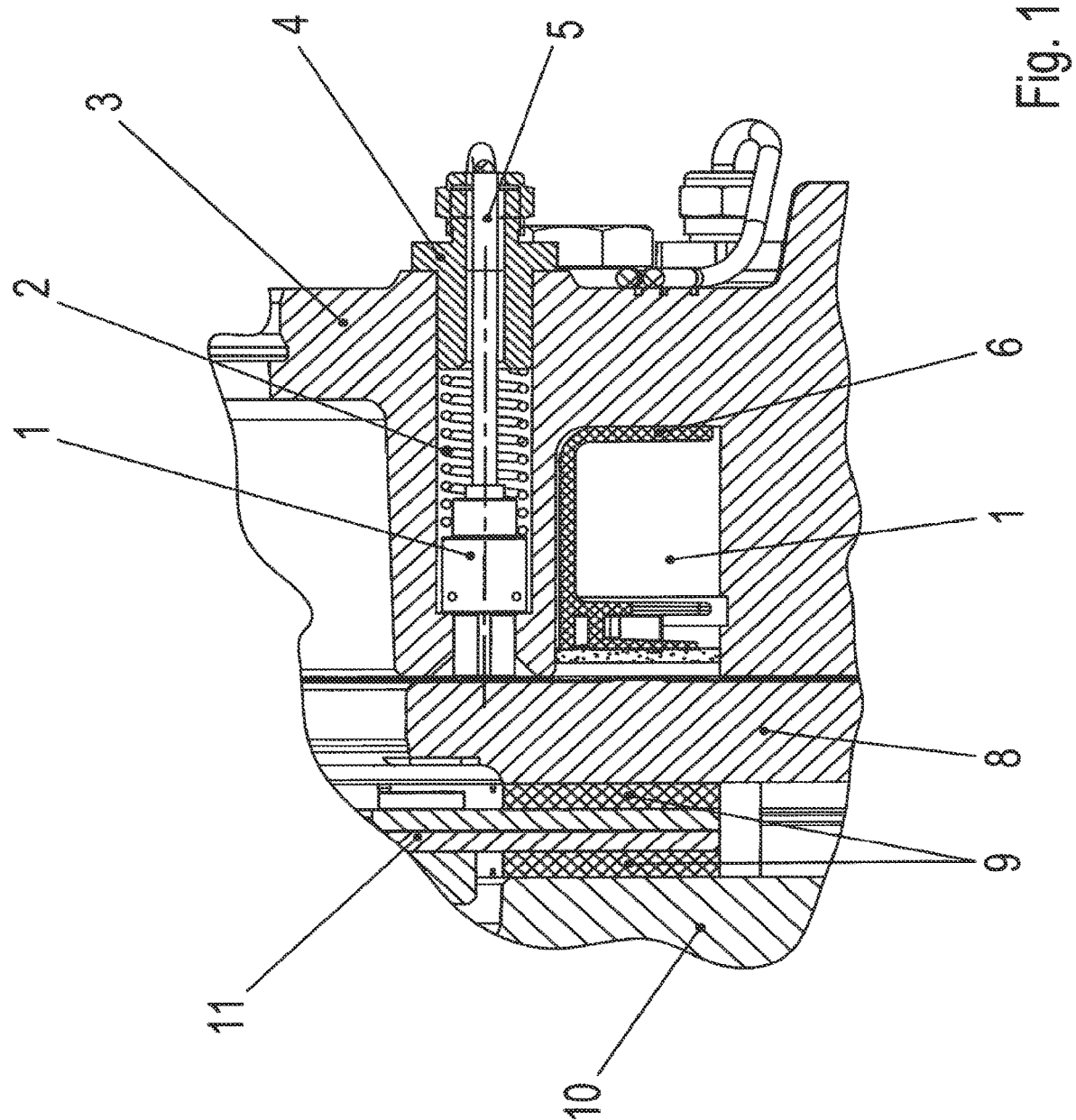
FIG. 1 shows a brake device according to an example embodiment of the present invention including a sensor for wear detection, in a sectional view.
Figure 2:
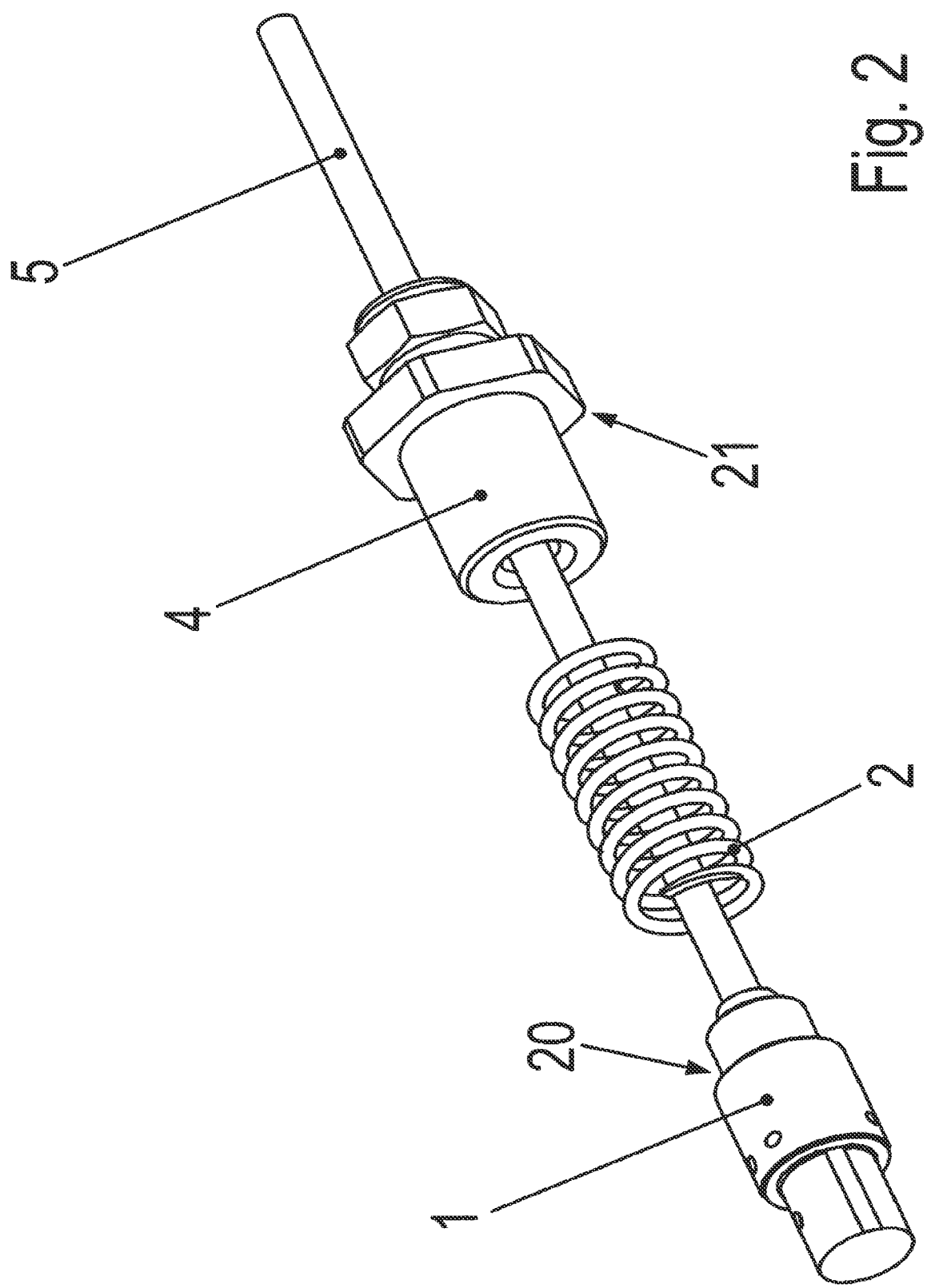
FIG. 2 shows the sensor with an associated mounting system in an oblique view.

As illustrated in FIG. 1 and FIG. 2, an electromagnetically actuable brake according to an example embodiment of the present invention is depicted.

A brake-pad carrier 11 is connected to a shaft to be braked in a torque-proof yet axially displaceable manner. The shaft is mounted inside a housing part that is connected to coil shell 3 of a solenoid in a torque-proof manner.

Brake-pad carrier 11 has an internal tooth system which is in engagement with an external tooth system disposed on the shaft. The tooth system extends in the axial direction so that brake-pad carrier 11 is able to be axially displaced in relation to the shaft.

A coil brace 6, in which an energizable coil 7 is situated, is accommodated in an annular groove of coil shell 3. The ring axis of the annular groove is aligned coaxially with respect to the shaft axis.

Brake-pad carrier 11 is provided with brake pads 9 axially on both sides. An armature disk 8 is situated axially between brake-pad carrier 11 and coil shell 3. For example, armature disk 8 is made from a ferromagnetic material. Armature disk 8 is connected to coil shell 3 in a torque-proof yet axially displaceable manner with the aid of guide elements, the armature disk being guided by the guide elements during the displacement.

Spring elements are situated between coil shell 3 and armature disk 8. An approach of armature disk 8 toward coil shell 3 can therefore only take place counter to the force generated by the spring elements.

When coil 7 is energized, armature disk 8 is pulled toward coil shell 3 counter to the spring force generated by the spring elements.

In the non-energized state of coil 7, the spring elements axially press armature disk 8 in the direction of brake-pad carrier 11, the latter being axially displaced in the process and pressed against a part 10, which has a brake surface and is firmly connected to coil shell 3.

In other words, in the non-energized state of coil shell 7, armature disk 8 is pushed away from coil shell 3 up to an axial stop position. The stop position is a function of the thickness of the brake pads. Depending on the wear, the axial distance between armature 8 and coil shell 3 thus differs in the non-energized state.

To monitor wear, a sensor is provided for sensing this distance.

The sensor is arranged as an eddy-current sensor.

The housing of the sensor has a stepped outer contour.

A through bore, in which the sensor is accommodated, is situated in coil shell 3. The bore also has a stepped configuration and has a cross-section that tapers in the direction of the armature disk. Via a corresponding step, housing 1 of the sensor rests against the step of the bore and includes a step 20 on the side facing away from this step and/or on the side facing away from armature disk 8. This step 20 leads from a first diameter to a second diameter which is smaller than the first diameter. The axial end region tapering in this manner is disposed at the end of sensor housing 1 facing away from armature disk 8.

Sensor housing 1 may be arranged as a rotating body.

Sensor cable 5 is centrally routed out of sensor housing 1. A spring part 2, arranged as a spiral spring, is accommodated in the bore and braced on step 20 of sensor housing 1. The end of the bore that faces away from armature disk 8 is sealed with the aid of a screwed cable gland 4, which presses against the end of spring part 2 facing away from step 20. Screwed cable gland 4 is connected by screws to an internal threaded section of the bore, or stated another way, is screwed into the bore.

The internal threaded section extends only across an end section of the bore and not across the entire bore. This end section of the bore is situated in the end region of the bore that faces away from armature disk 8.

Screwed cable gland 4 may be formed of metal.

In the same manner, sensor housing 1 and spring part 2 are made from metal.

When screwing screwed cable gland 4 into the bore, spring part 2 is tensioned and thus presses against sensor housing 1. Because of the preloading created in this manner, the sensor housing 1 is pressed against the step of the bore.

Cable 5 is axially routed through spring part 2 in a centered manner and is then centrically routed through a recess in screwed cable gland 4 in the axial direction.

Screwed cable gland 4 has a hexagonal shoulder 21, which limits the screwing-in of screwed cable gland 4 and is furthermore suitable for the positive application of an open end wrench. This makes it easy to screw screwed cable gland 4 into the threaded section of the bore.

Figure 3:
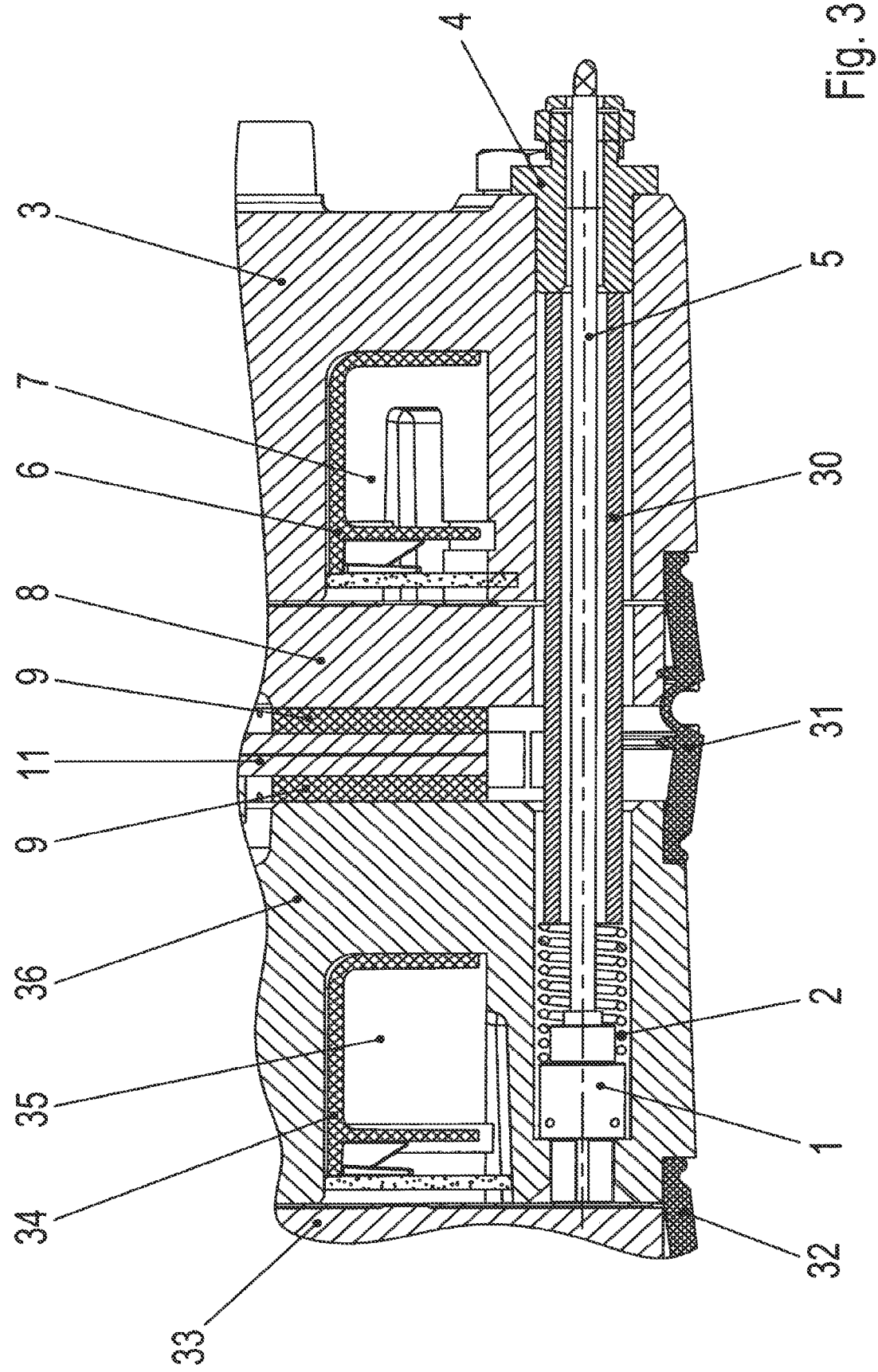
FIG. 3 shows an alternative brake device equipped with a sensor for wear detection, in a sectional view.
Figure 4:
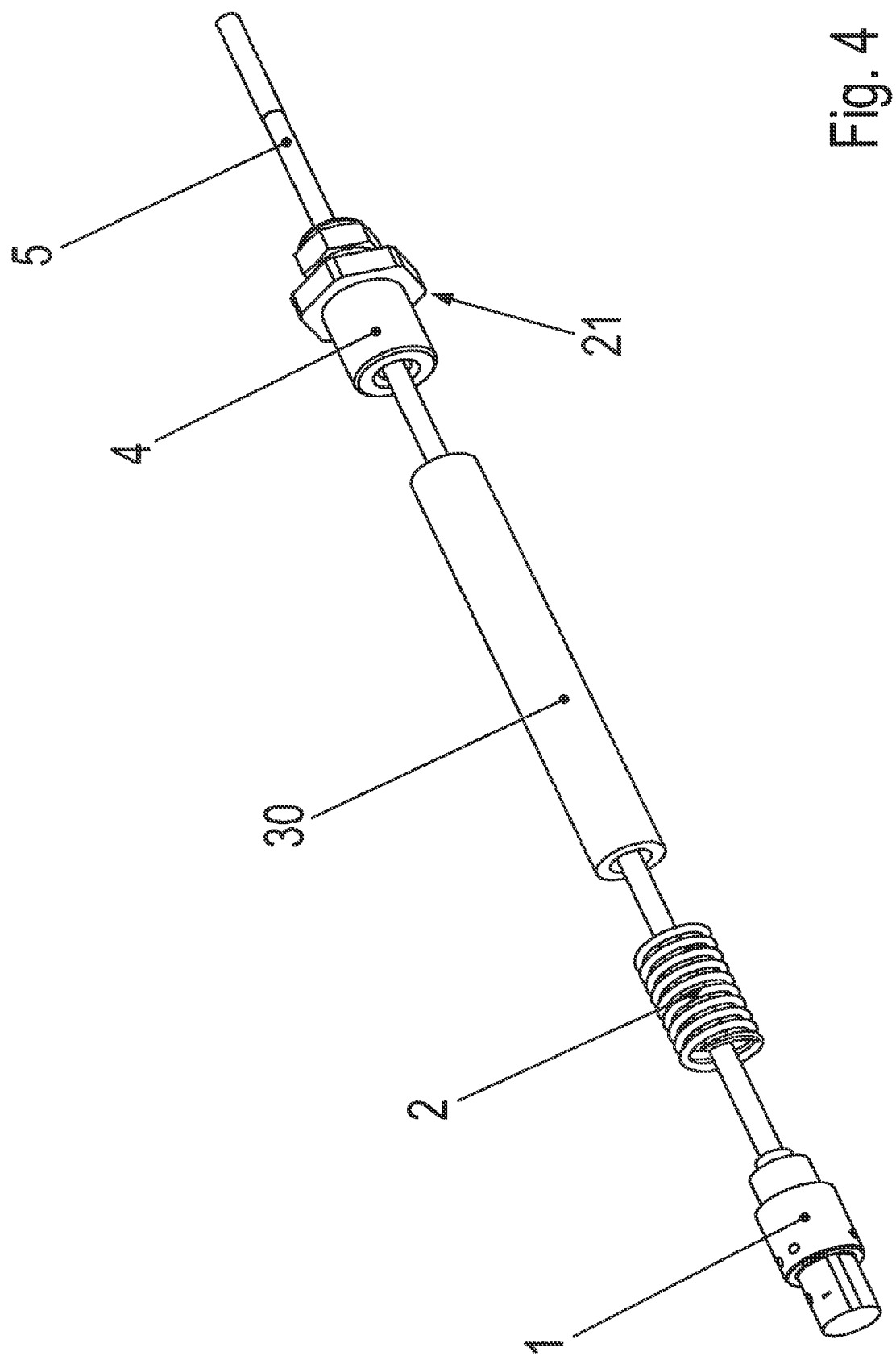
FIG. 4 shows the sensor associated with FIG. 3 with an associated mounting system, in an oblique view.

In contrast to the exemplary embodiment according to FIGS. 1 and 2, in the exemplary embodiment according to FIGS. 3 and 4 a sleeve 30 for spacing spring part 2 apart from sensor housing 1 is placed inside the bore.

In this way the sensor is able to be installed on a second brake situated at a greater distance, sleeve 30 bridging a first brake.

As illustrated in FIGS. 3 and 4, a first and a second electromagnetically operable brake are provided in the double brake.

The first brake is arranged according to FIG. 1. The second brake has a similar configuration; here, the part of the second brake having a counter-brake surface is not a coil shell or need not be a coil shell, but may exemplarily be arranged as a bearing shield of an electric motor.

In this case, a second coil shell 36 is used as the particular part 10 that has a brake surface for brake-pad carrier 11 with brake pad 9. Second coil shell 36 is firmly connected to coil shell 3 of the first brake, in particular connected with the aid of screws.

Another annular groove, its ring axis being aligned coaxially with the shaft axis, is also situated in second coil shell 36.

Once again, a coil brace 34, which accommodates a second coil 35, is accommodated in the annular groove of second coil shell 36.

A second brake-pad carrier 11 is connected to the shaft in a torque-proof yet axially displaceable manner; the shaft has an axially extending external tooth system for this purpose, which is in engagement with an internal tooth system of brake-pad carrier 11. An armature disk 33 is axially situated between the second brake-pad carrier and second coil shell 36 and connected to second coil shell 36 in a torque-proof yet axially displaceable manner with the aid of guide elements.

Second spring elements are situated between second armature disk 33 and second coil shell 36 so that when second coil 35 is energized, armature disk 33 is pulled toward coil shell 36 counter to the spring force generated by the second spring elements. In the non-energized state of second coil 35, second armature disk 33 is axially pushed away from second coil shell 36 and onto the second brake-pad carrier with brake pads. The second brake-pad carrier in turn is axially pressed onto a part having a counter-brake surface, the part being situated on the side of the second brake-pad carrier axially facing away from armature disk 33.

A sensor for wear detection of the brake pads of the second brake is in turn disposed in a bore that is situated in coil shell 36 in an axially uninterrupted manner and has a stepped configuration; the narrower and/or tapered section of the bore is situated on the side facing second armature disk 33, and the section having the larger cross-section is situated on the side facing second armature disk 33.

The bore, so to speak, continues through armature disk 8 of the first brake and through coil shell 3 of the first brake. The bores in armature disk 8 and coil shell 3 have a coaxial alignment and are arranged using at least the same cross-section.

Thus, sensor housing 1 is pressed against the step of the bore implemented in second coil shell 36, and a corresponding step of the sensor housing is placed against the step of the bore introduced into second coil shell 36, or in other words, is pressed against it.

A spring part 2 is in turn pressing against step 20 of sensor housing I; however, at its axial end facing away from sensor housing 1, spring part 2 is braced on a sleeve 30, which is in turn braced at its axial end facing away from spring part 2 on screwed cable gland 4, which is screwed into coil shell 3 in the threaded section.

This screwed cable gland is in turn resting against coil shell 3 via its shoulder 21.

Sleeve 30 is hollow. Thus, cable 5 is centrically routed through spring part 2 and sleeve 30 so that it is likewise able to be centrically routed through the screwed cable gland and out of the interior space of the brake device in a sealed manner.

The bore and sleeve 30 are situated at a radial distance from the shaft axis such that brake-pad carrier 11 together with brake pads 9 is radially situated within the bore and sleeve 30. The axial range covered by sleeve 30 covers the axial range covered by armature disk 8 and the axial range covered by brake-pad carrier 11 with brake pads 9, and it overlaps with the axial range covered by coil shell 3 and by second coil shell 36.

Coil shell 3 and second coil shell 36 are connected with the aid of a cover 31, especially a rubber cover, so that the intermediate region situated axially between coil shell 3 and coil shell 36 is covered in the manner of a housing. Cover 31 has an annular design for this purpose and is placed in a nonpositive manner onto a subregion of the external surface of coil shell 3 and coil shell 36.

Situated in the intermediate region are brake-pad carrier 11 together with brake pads 9 and armature disk 8. The region axially covered by cover 31 therefore covers the axial region covered by brake-pad carrier 11 together with brake pads 9 and the axial region covered by armature disk 8.

In addition, when viewed from the direction of the shaft axis, cover 31 is situated radially outside brake-pad carrier 11 together with brake pads 9 and armature disk 8.

Coil shell 36 and the part having the counter-brake surface are similarly connected with the aid of a cover 32, in particular a rubber cover, so that the second intermediate region that is situated axially between second coil shell 36 and the part having the counter-brake surface is covered in the manner of a housing. Cover 32 has an annular design for this purpose and is placed in a nonpositive manner on a subregion of the external surface of coil shell 36 and of the part having the counter-brake surface.

Situated in the second intermediate region are the second brake-pad carrier together with the brake pads and second armature disk 33. As a result, the region axially covered by cover 32 covers the axial region covered by the second brake-pad carrier together with the brake pads and the axial region covered by armature disk 33.

In addition, when viewed from the direction of the shaft axis, cover 32 is situated radially outside the second brake-pad carrier together with the brake pads and armature disk 33.

Cover 31 may be arranged in the same manner as cover 32. As a result, only one type of cover needs to be stocked.

Sleeve 30 is situated at a greater radial distance than coil 7, coil shell 6 and/or the annular groove in coil shell 3 and/or the annular groove in coil shell 36.

LIST OF REFERENCE NUMERALS

1 Sensor housing, stepped configuration
2 Spring part
3 Coil shell
4 Screwed cable gland
5 Cable
6 Coil brace
7 Coil, in particular brake coil
8 Armature disk
9 Brake pad
10 Part having the brake surface
11 Brake-pad carrier
20 Step
21 Shoulder
30 Sleeve
31 Cover, in particular rubber cover
32 Cover, in particular rubber cover
33 Further armature disk
34 Further coil brace
35 Further coil
36 Further coil shell

What is claimed is:

1. A sensor system for an electromagnetically actuable brake device, comprising:
   a coil shell including a stepped through bore;
   a sensor including a stepped sensor housing; and
   a spring part arranged in the bore and pressing the sensor housing against a step of the stepped through bore.

2. The sensor system according to claim 1, wherein one side of the spring part is braced on a step of the sensor housing.

3. The sensor system according to claim 1, wherein the stepped through bore transitions at the step from a first diameter to a second diameter, the second diameter being smaller than the first diameter.

4. The sensor system according to claim 3, wherein the sensor housing includes a step, the sensor housing having a first diameter on a first side of the step of the sensor housing and a second diameter on second side, opposite the first side, of the step of the sensor housing.

5. The sensor system according to claim 4, wherein the first diameter of the sensor housing is smaller than the first diameter of the stepped through bore, and the second diameter of the sensor housing is smaller than the second diameter of the stepped through bore.

6. The sensor system according to claim 1, wherein a portion of the sensor housing having the first diameter is arranged in a portion of the stepped through bore having the first diameter, and wherein a portion of the sensor housing having the second diameter is arranged in a portion of the stepped through bore having the second diameter.

7. The sensor system according to claim 4, wherein the spring part presses the step of the sensor housing against the step of the stepped through bore.

8. The sensor system according to claim 1, wherein the sensor housing includes a first step and a second step, the spring part pressing the first step against the step of the stepped through bore and being braced against the second step of the sensor housing.

9. The sensor system according to claim 1, further comprising a screwed cable gland arranged at an end of the stepped through bore, the spring part being arranged between the screwed cable gland and the sensor housing.

10. The sensor system according to claim 1, wherein the sensor is arranged as an eddy-current sensor.

11. The sensor system according to claim 1, wherein the sensor is adapted to sense a distance between an armature disk of the brake device and the sensor.

12. The sensor system according to claim 9, wherein the screwed cable gland is screwed into a threaded section of the stepped through bore.

13. The sensor system according to claim 1, wherein the sensor and the stepped through bore are located at a greater radial distance from an axis of a shaft of the brake device to be braked than a coil of a solenoid of the brake device.

14. The sensor system according to claim 1, further comprising a cable centrically routed from the sensor through the spring part.

15. The sensor system according to claim 14, further comprising a screwed cable gland arranged at an end of the stepped through hole, the spring part being arranged between the screwed cable gland and the sensor housing, the cable being arranged centrically through the screwed cable gland.

16. The sensor system according to claim 1, wherein the sensor is adapted to monitor wear of a brake pad of the brake system by sensing an axial distance between an armature of the brake system and the coil shell.

17. The sensor system according to claim 1, wherein the spring part is arranged as a helical spring.

18. The sensor system according to claim 1, wherein the step is arranged at a first end of the stepped through bore.

19. The sensor system according to claim 18, further comprising a screwed cable gland arranged at a second end of the stepped through bore opposite the first end, the spring part being arranged between the screwed cable gland and the sensor housing.

20. The sensor system according to claim 9, wherein the screwed cable gland includes a hexagonal shoulder engaging against a surface of the coil shell.

* * * * *